(12) United States Patent  (10) Patent No.: US 7,653,918 B2
Ho  (45) Date of Patent: Jan. 26, 2010

(54) STOPPER FOR PREVENTING THE SEPARATION BETWEEN THE TRAVERSE AND THE TRAVERSE FRAME IN AN OPTICAL DISC DRIVE

(75) Inventor: Chun-Lung Ho, Hsinchu (TW)

(73) Assignee: Lite-On It Corporation, Taipei (TW)

( * ) Notice: Subject to any disclaimer, the term of this patent is extended or adjusted under 35 U.S.C. 154(b) by 483 days.

(21) Appl. No.: 11/538,526

(22) Filed: Oct. 4, 2006

(65) Prior Publication Data

US 2008/0086740 A1    Apr. 10, 2008

(51) Int. Cl.
G11B 7/00 (2006.01)
G11B 17/03 (2006.01)
G11B 33/08 (2006.01)

(52) U.S. Cl. ............. 720/692; 720/611; 720/651; 720/688

(58) Field of Classification Search ............. 720/692, 720/611, 651, 657, 674, 688
See application file for complete search history.

(56) References Cited

U.S. PATENT DOCUMENTS

| 6,934,961 B2 * | 8/2005 | Itakura ............. 720/692 |
| 7,120,920 B1 * | 10/2006 | Maeda ............. 720/692 |
| 2003/0012120 A1 * | 1/2003 | Chen et al. ............. 369/247 |
| 2004/0163096 A1 * | 8/2004 | Lin et al. ............. 720/692 |
| 2005/0216927 A1 * | 9/2005 | Amitani ............. 720/651 |
| 2006/0294533 A1 * | 12/2006 | Wu et al. ............. 720/692 |

* cited by examiner

*Primary Examiner*—Andrea L Wellington
*Assistant Examiner*—Gustavo Polo
(74) *Attorney, Agent, or Firm*—Thomas, Kayden, Horstemeyer & Risley (57) ABSTRACT

The present invention discloses an optical disk drive comprising a traverse, a traverse frame, a chassis and a stopper. The traverse frame is disposed on the chassis. And one end of the traverse is disposed on the chassis and the other end is disposed on the traverse frame. The stopper includes a protruded arm and an extended arm extended from the protruded arm. The protruded arm is integrated with the traverse by sheet metal forming and the extended arm is disposed above the traverse frame. The extended arm of the stopper is interfered with the traverse frame when a heavy shock is applied to the optical disk drive. Therefore, the optical disk drive including the stopper can prevent the separation between the traverse and the traverse frame without screws when a sudden hit is applied thereto.

4 Claims, 8 Drawing Sheets

STOPPER FOR PREVENTING THE SEPARATION BETWEEN THE TRAVERSE AND THE TRAVERSE FRAME IN AN OPTICAL DISC DRIVE

FIELD OF THE INVENTION

The present invention relates to an optical disk drive, and more particularly to an optical disk drive preventing the separation between a traverse and a traverse frame.

BACKGROUND OF THE INVENTION

Figure 1:
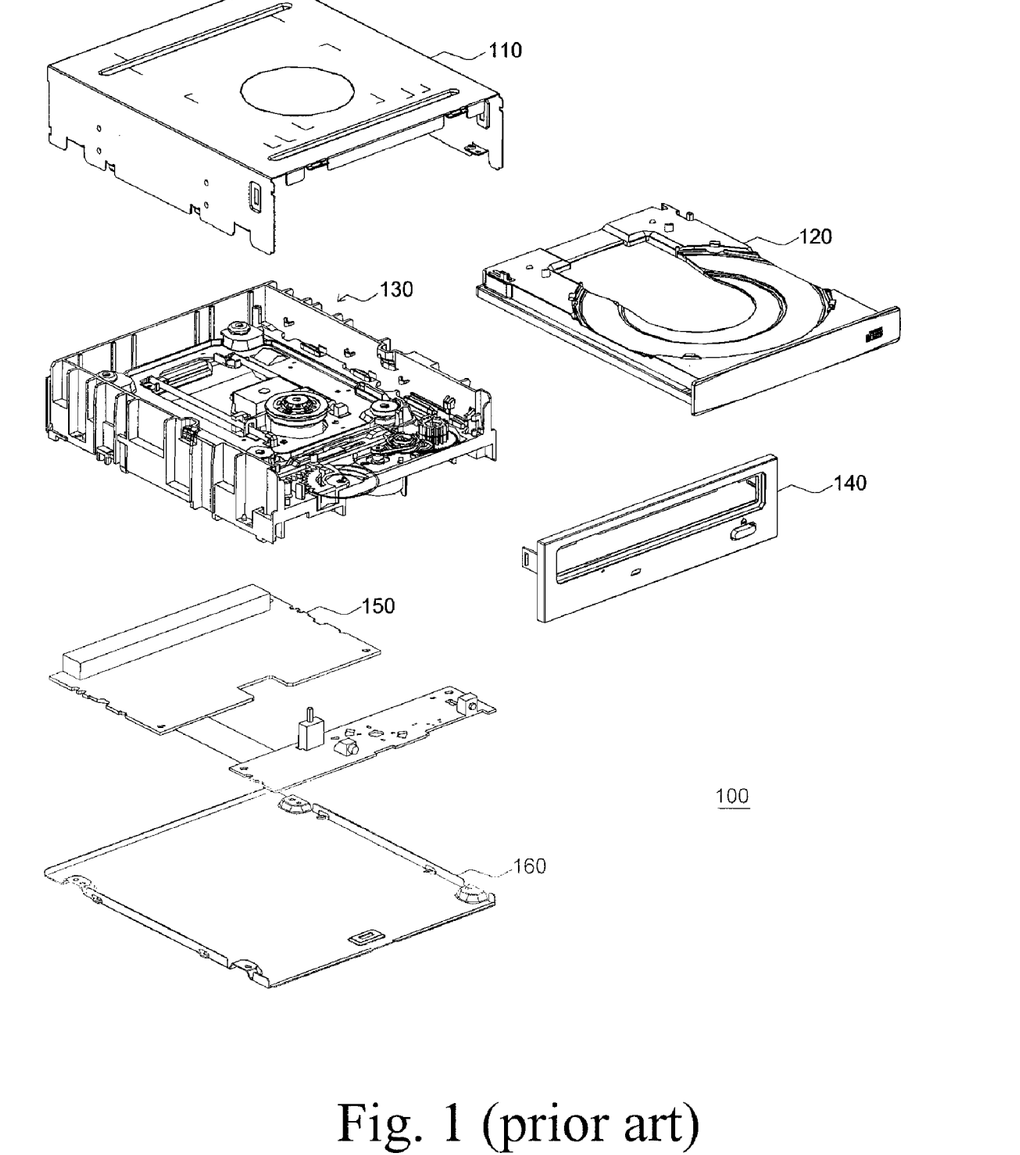
FIG. 1 is a partially exploded view of a conventional optical disk drive.

Referring to FIG. 1, a partially exploded view of a conventional optical disk drive 100 is shown. The optical disk drive 100 includes a top cover 110, a tray 120 for loading an optical disk, a loader 130, a bezel 140, a circuit board 150 and a bottom cover 160. The optical disk drive 100 is used to read and/or write information on the optical disk.

Figure 2:
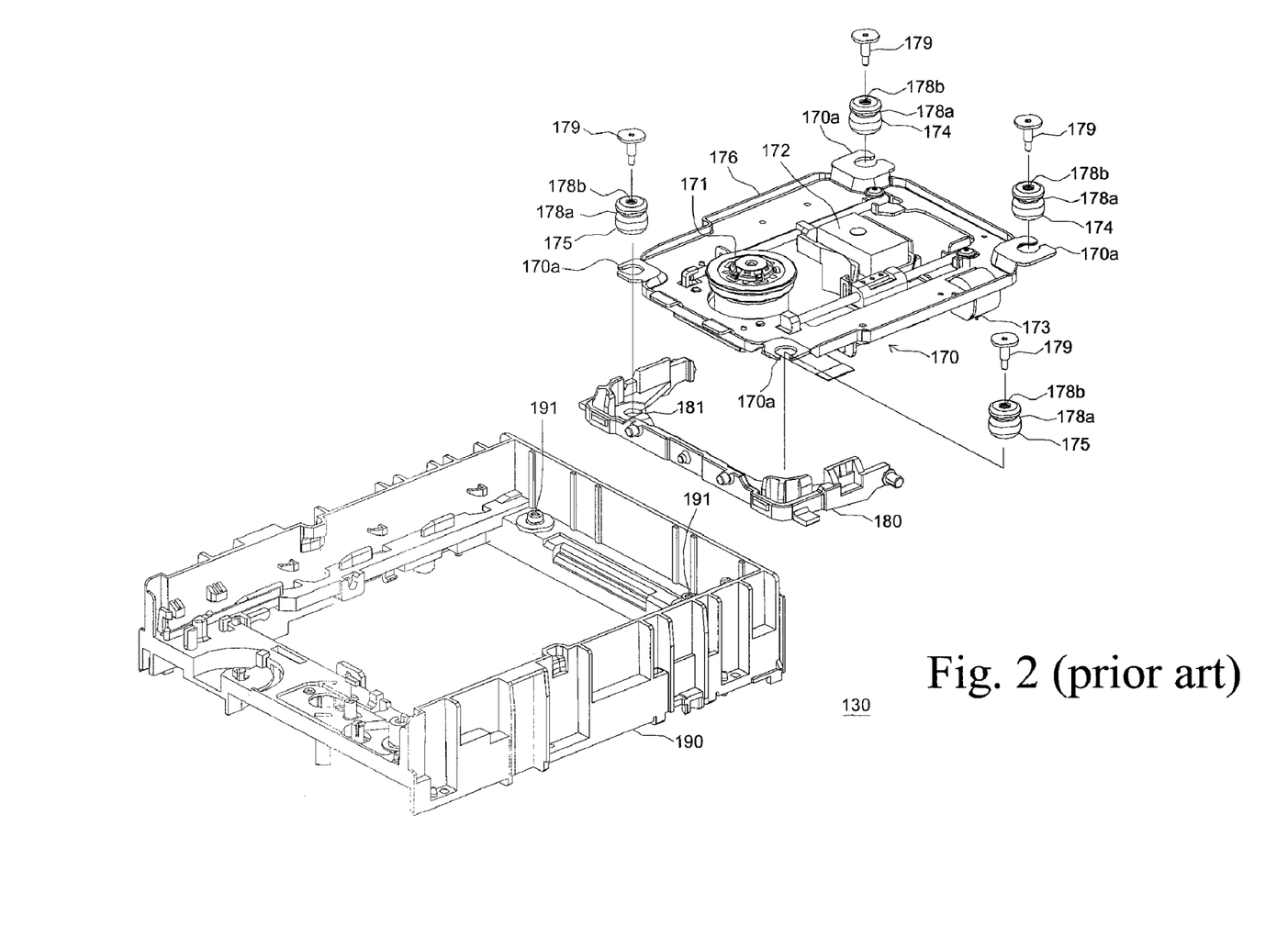
FIG. 2 is a partially exploded view of a loader shown in FIG. 1.

Please refer to FIG. 2. A partially exploded view of the loader 130 as shown in FIG. 1 is presented. The loader 130 comprises a reading unit 170, a traverse frame 180 and a chassis 190. The traverse frame 180 is disposed on the chassis 190. The reading unit 170 includes a spindle motor 171 for supporting and rotating the optical disk, an optical pickup head 172 for reading and/or writing the optical disk, a stepping motor 173 for moving the optical pickup head 172, and a traverse 176. The spindle motor 171, the optical pickup head 172, and the stepping motor 173 are disposed on the traverse 176.

The reading unit 170 further includes four dampers 174 and 175. Each of the dampers 174 and 175 has a neck 178a and a through hole 178b. The neck 178a is clamped on a flange 170a of the traverse 176. The reading unit 170 further includes four screws 179. The screws 179 are passed through the through hole 178b and screwed into the positioning holes 181 and 191. More specifically, two screws 179 are used to fasten the dampers 174 on the chassis 190 and the other two screws 179 are used to fasten the dampers 175 on the traverse frame 180. Consequently, the dampers 174 are disposed between the traverse 176 and the chassis 190 and the dampers 175 are disposed between the traverse 176 and the traverse frame 180.

When a sudden hit is applied to the optical disk drive 100, for example, falling down on the floor, the chassis 190, the traverse frame 180 and the reading unit 170 have movement to each other. The dampers 174 and 175 are deformed to reduce the vibration of the reading unit 170, and the screws 179 can constrain the degree of the deformation of the dampers 174 and 175 to avoid the separation between the reading unit 170, the chassis 190 and the traverse frame 180.

However, it is need to reduce the elements in the optical disk drive, for example, screws, to reduce the cost of the optical disk drive and make the optical disk drive easy to assemble.

SUMMARY OF THE INVENTION

The object of the present invention is to provide an optical disk drive which can prevent the separation between a traverse and a traverse frame without screws when a sudden hit is applied thereto.

Another object of the present invention is to provide an optical disk drive which has lower cost and is easy to assemble.

An optical disk drive of the present invention comprises a traverse, a traverse frame, a chassis and a stopper. The traverse frame is disposed on the chassis. And one end of the traverse is disposed on the chassis and the other end is disposed on the traverse frame. The stopper includes an extended arm and a protruded arm. The protruded arm is integrated with the traverse by sheet metal forming and is bended upward or downward to the traverse. The extended arm is extended form the protruded arm and is disposed above the traverse frame. The extended arm of the stopper is interfered with the traverse frame when a heavy shock is applied to the optical disk drive.

According to the present invention, the optical disk drive further includes a damper having two necks. The two necks are clamped on a first flange of the traverse and a second flange of the traverse frame, respectively. The damper is soft and deformable so as to reduce the vibration of the traverse and the traverse frame.

According to the present invention, the traverse is disposed on the traverse frame by the damper having two necks. The optical disk drive including the stopper can prevent the separation between the traverse and the traverse frame without screws when a sudden hit is applied thereto. And the optical disk drive of the present invention has lower cost and is easy to assemble.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTIONS OF THE PREFERRED EMBODIMENT

Figure 3:
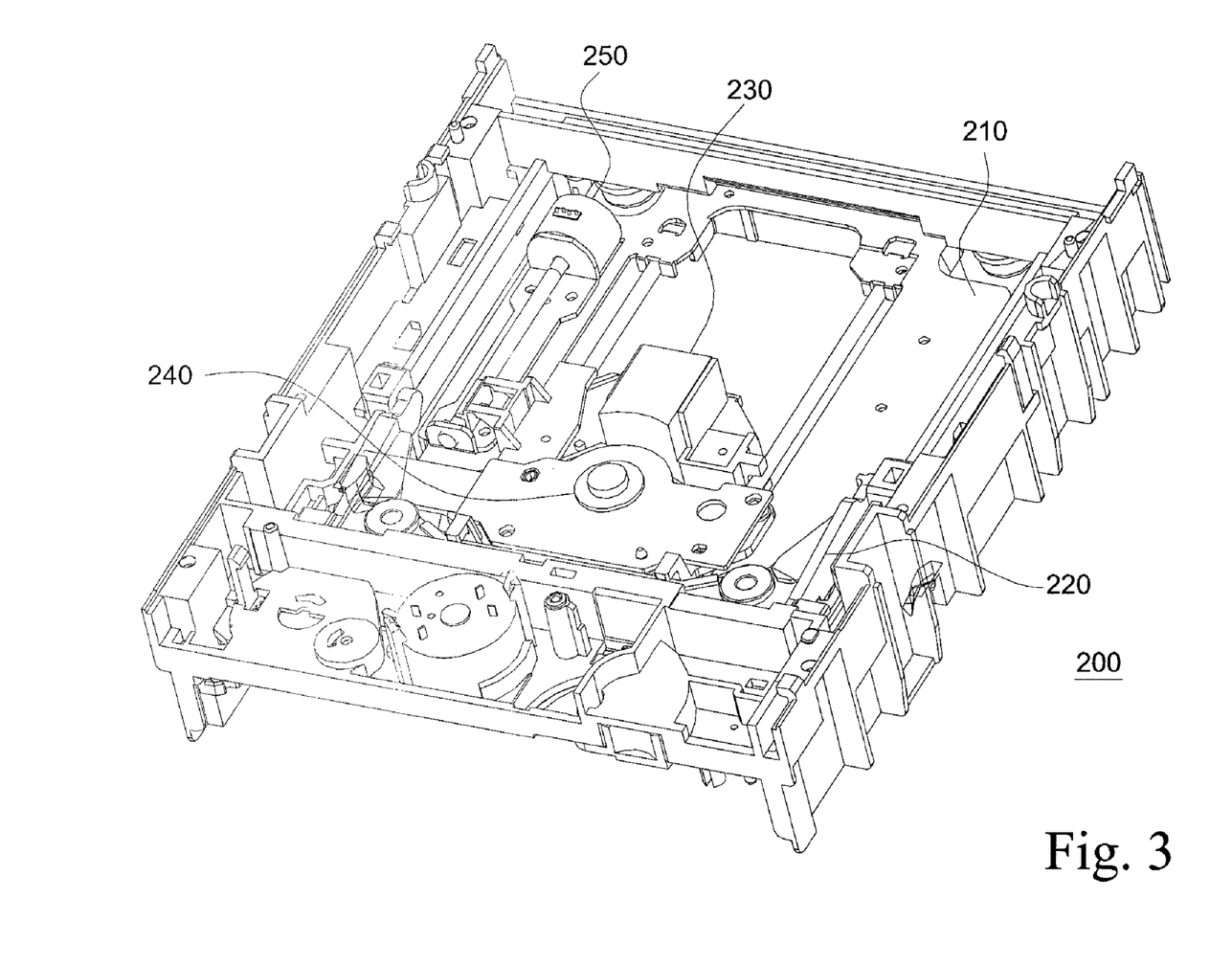
FIG. 3 is a perspective view of a loader of an optical disk drive according to the first embodiment of the present invention.
Figure 4:
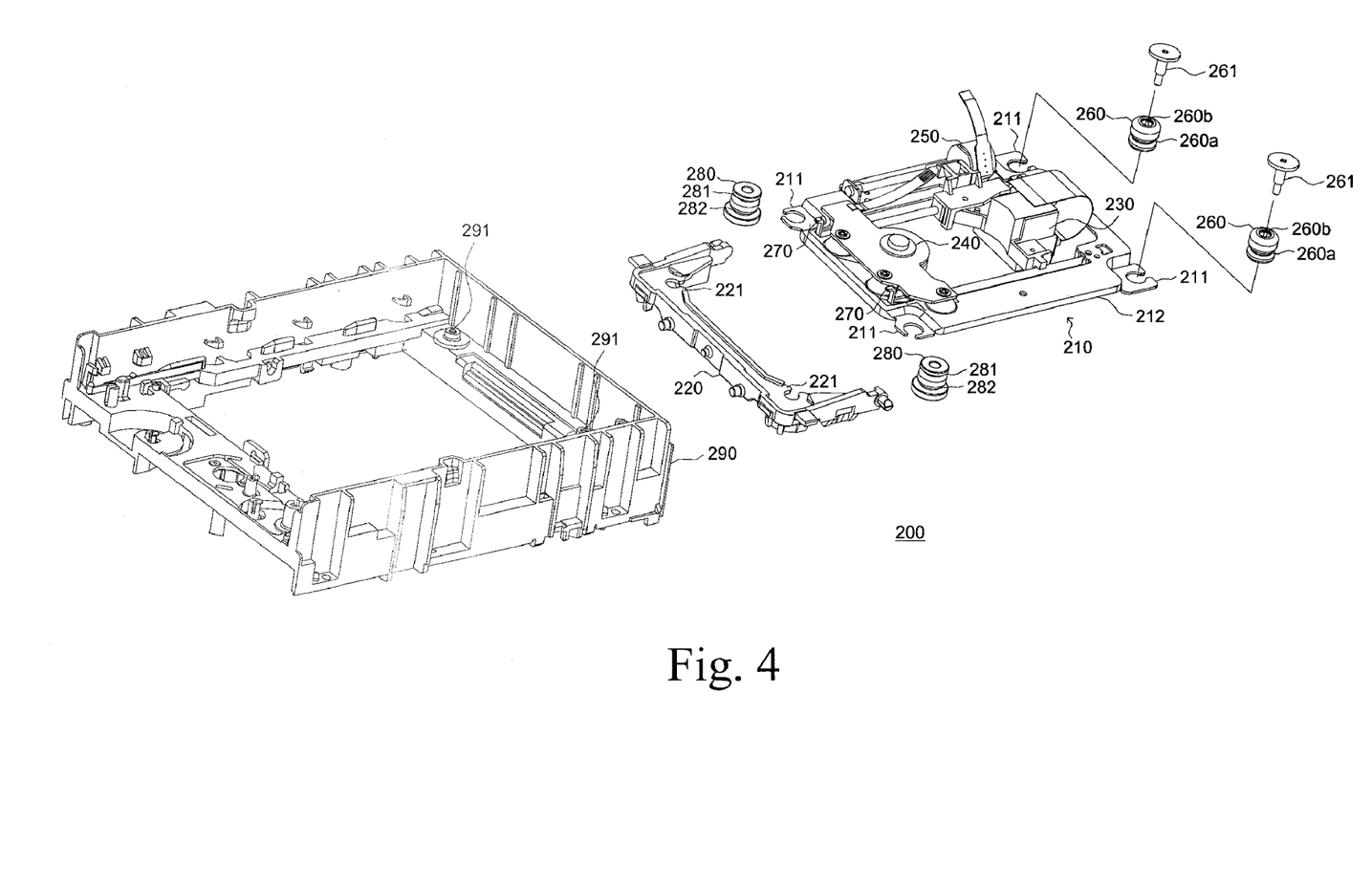
FIG. 4 is a partially exploded view of the loader show in FIG. 3.
Figure 5:
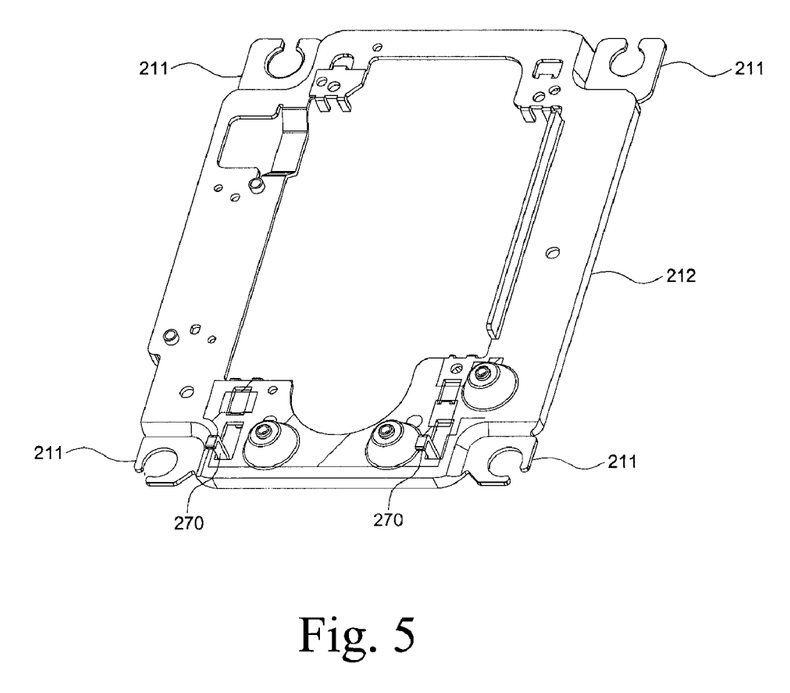
FIG. 5 is a perspective view of a traverse according to the first embodiment.
Figure 6:
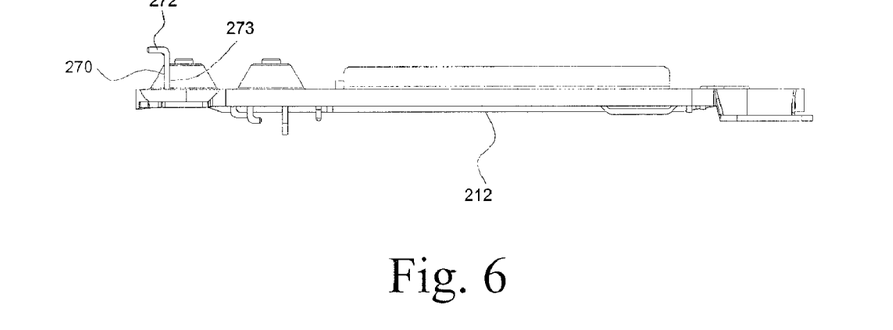
FIG. 6 is a side view of the traverse shown in FIG. 5.

Please refer to FIGS. 3 to 6. FIG. 3 is a perspective view of a loader 200 of an optical disk drive according to the first embodiment of the present invention. FIG. 4 shows the partially exploded view of the loader 200 shown in FIG. 3. FIGS. 5 and 6 show a perspective and a side view of a traverse 212 according to the first embodiment.

In FIG. 3, a loader 200 of an optical disk drive comprising a reading unit 210, a traverse frame 220 and a chassis 290 is presented. The reading unit 210 includes an optical pickup head 230 for reading and/or writing an optical disk, a spindle motor 240 for supporting and rotating the optical disk, a stepping motor 250 for moving the optical pickup head 230, and a traverse 212. The optical pickup head 230, the spindle motor 240 and the stepping motor 250 are disposed on the traverse 212.

Referring to FIG. 4, the reading unit 210 further includes two dampers 260 having a neck 260a and a through hole 260b, respectively. The neck 260a is clamped on a first flange 211 of the traverse 212. Two screws 261 are passed through the through holes 260b and screwed into two positioning holes 291 of the chassis 290. The dampers 260 are fastened between the traverse 212 and the chassis 290 by the screws 261. Consequently, one end of the traverse 212 is disposed on the chassis 290.

The reading unit 210 according to the present invention further comprises two dampers 280. Each of the dampers 280 is soft and deformable and has a first neck 281 and a second neck 282. The first neck 281 and the second neck 282 are clamped on the first flange 211 of the traverse 212 and a second flange 221 of the traverse frame 220, respectively. In other words, the damper 280 connects the traverse frame 220 and the traverse 212. The other end of the traverse 212 is disposed on the traverse frame 220

Figure 9:
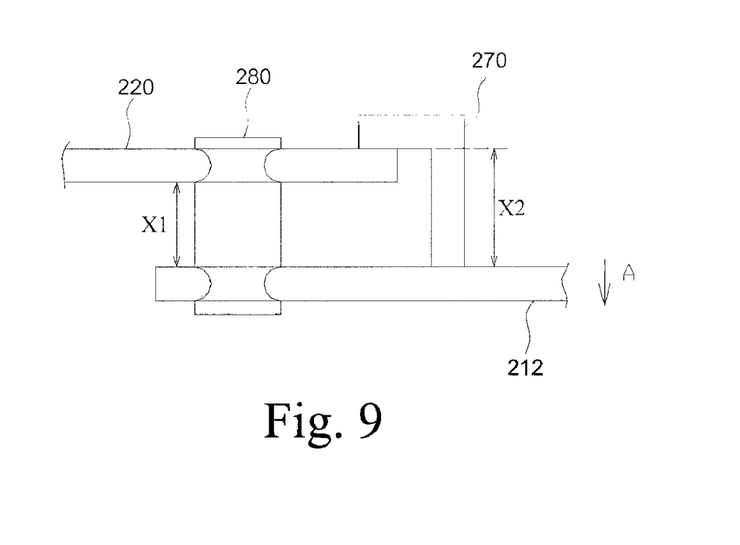
FIG. 9 is a sectional view of the interference between a stopper and the traverse frame.

Referring to FIGS. 5 and 6, a stopper 270 integrated with the traverse 212 by sheet metal forming is shown. The stopper 270 includes an extended arm 272 and a protruded arm 273. The protruded arm 273 is nearly vertically extended from the traverse 212 and is integrated with the traverse 212 by sheet metal forming. The extended arm 272 is extended form the protruded arm 273 and nearly parallel to the traverse 212. The extended arm 272 is disposed above the traverse frame 220 and is interfered with the traverse frame 220 as shown in FIG. 9. In the first embodiment, the protruded arm 273 is bended upward to the traverse 212 as show in FIG. 6. And more specifically, the stopper 270 is a L-shaped structure and the extended arm 272 is nearly vertical to the protruded arm 273 as shown in FIG. 6.

Figure 7:
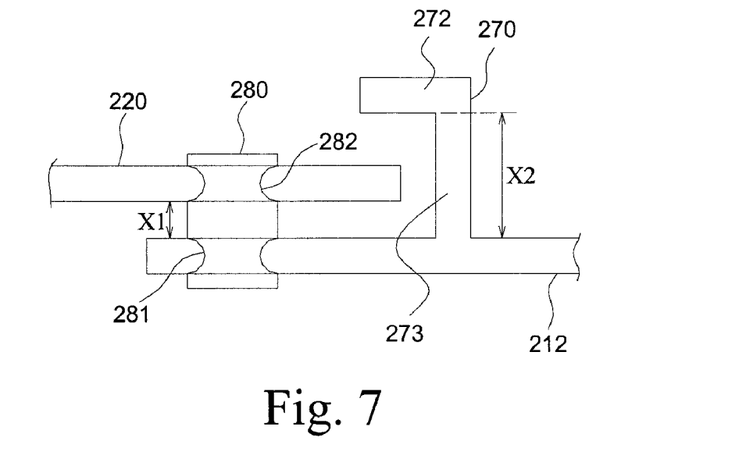
FIG. 7 is a schematic sectional view of the traverse and a traverse frame according to the first embodiment.
Figure 8:
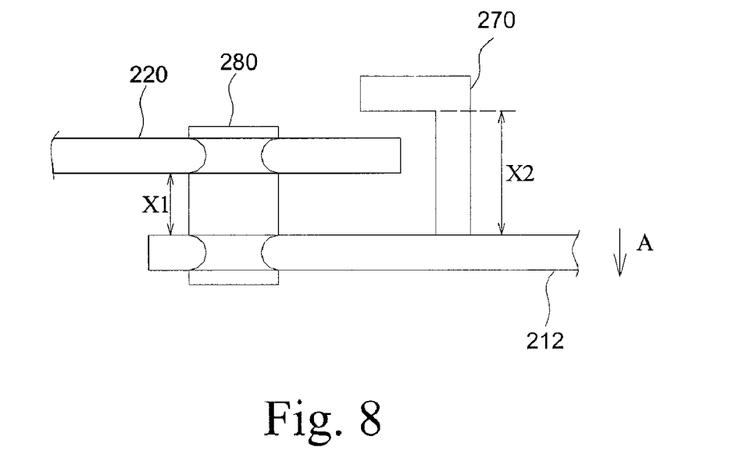
FIG. 8 is a sectional view of the traverse moving in the direction of A.

Please refer to FIGS. 7 to 9. FIG. 7 shows the sectional view of the traverse 212 and the traverse frame 220. FIGS. 8 and 9 show the movement of the traverse 212 when a sudden hit is applied thereto.

FIG. 7 shows that, in the normal state, the damper 280 provides a first gap X1 between the traverse 212 and the traverse frame 220, and the stopper 270 provides a second gap X2 between the first extended arm 272 and the traverse 212. The first gap X1 is smaller than the second gap X2. Preferably, the gap between the first extended arm 272 and the traverse frame 220 is 2 mm in the first embodiment.

In FIG. 8, the traverse 212 moves downward in the direction of A under a small shock, and the first gap X1 is increased due to the deformation of the damper 280. The damper 280 is deformed so as to reduce the vibration of the traverse 212. And the first gap X1 is smaller than the second gap X2 as shown in FIG. 8.

Referring to FIG. 9, the interference between the stopper 270 and the traverse frame 220 is shown. When the shock is heavy, the damper 280 cannot entirely reduce the vibration of the traverse 212, and the traverse 212 further moves downward until interfered by the extended arm 272 of the stopper 270. The stopper 270 constrains the movement of the traverse 212 by interference and the first gap X1 is smaller than the second gap X2 as shown in FIG. 9. The traverse 212 and the traverse frame 220 would not be separated even when the optical disk drive suffers a heavy hit according to the present invention.

Figures 10, 11:
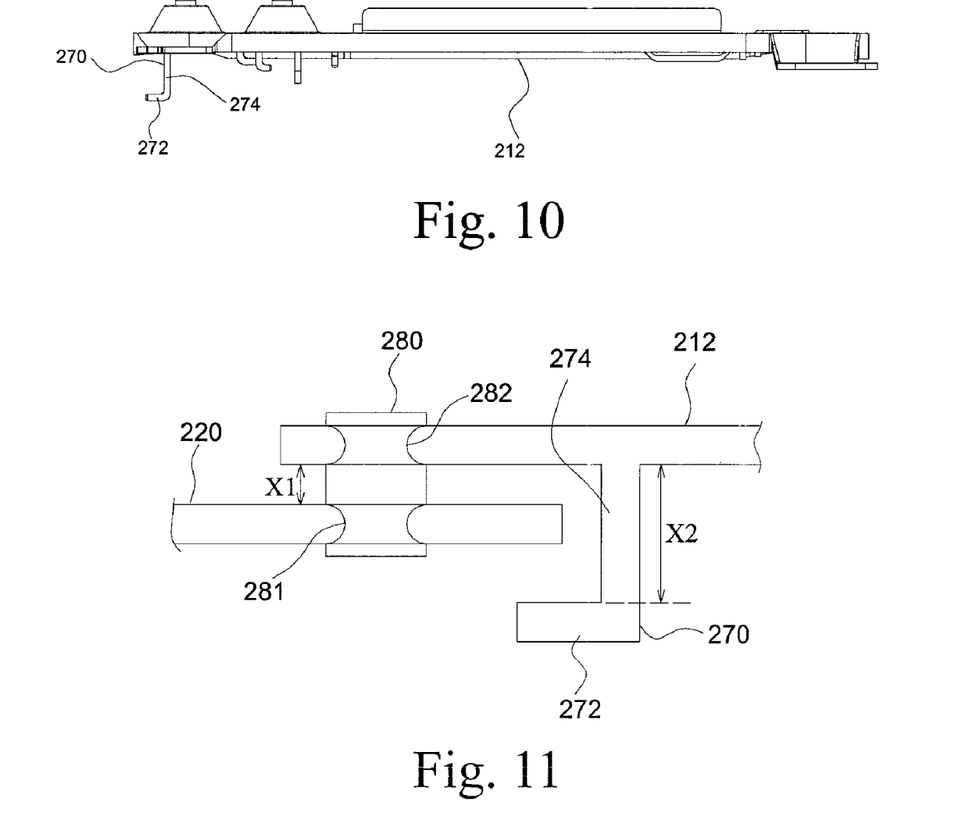
FIG. 10 is a side view of a traverse according to the second embodiment of the present invention.
FIG. 11 is a schematic sectional view of the traverse and a traverse frame according to second embodiment.

Please refer to FIG. 10. A side view of the traverse 212 of the second embodiment according to the present invention is shown. The optical disc drive of the second embodiment is similar to the first embodiment. The difference is that the stopper 270 includes an extended arm 272 and a protruded arm 274. The extended arm 272 is extended from the protruded arm 274 and is nearly parallel to the traverse 212. The protruded arm 274 is integrated with the traverse 212 and bended downward by sheet metal forming. The protruded arm 274 is nearly vertically extended from the traverse 212. And more specifically, the stopper 270 is a L-shaped structure and the extended arm 272 is nearly vertical to the protruded arm 274 as shown in FIG. 10.

FIG. 11 shows that, in the normal state, the damper 280 provides a first gap X1 between the traverse 212 and the traverse frame 220, and the stopper 270 provides a second gap X2 between the extended arm 272 and the traverse 212. The first gap X1 is smaller than the second gap X2. Preferably, the gap between the extended arm 272 and the traverse frame 220 is 2 mm in the second embodiment.

Figure 12:
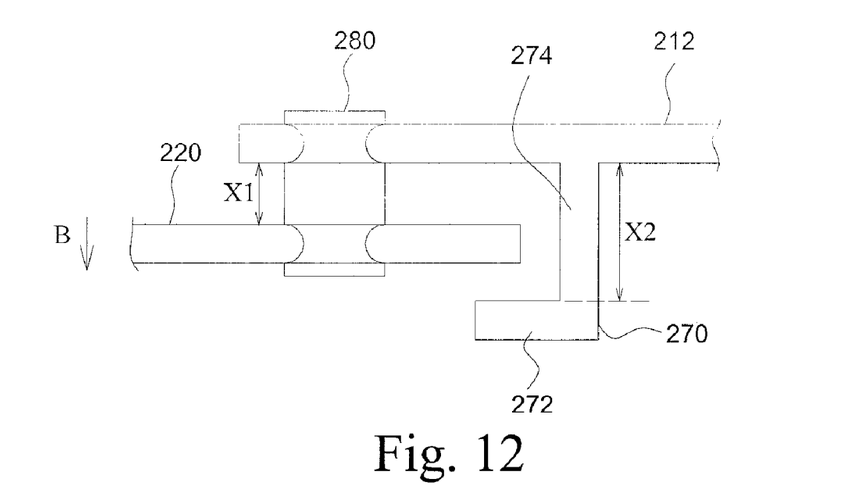
FIG. 12 is a sectional view of the traverse frame moving in the direction of B.

In FIG. 12, the traverse frame 220 moves downward in the direction of B under a small shock, and the first gap X1 is increased due to the deformation of the damper 280. The damper 280 is deformed so as to reduce the vibration of the traverse frame 220. And the first gap X1 is smaller than the second gap X2 as shown in FIG. 12.

Figure 13:
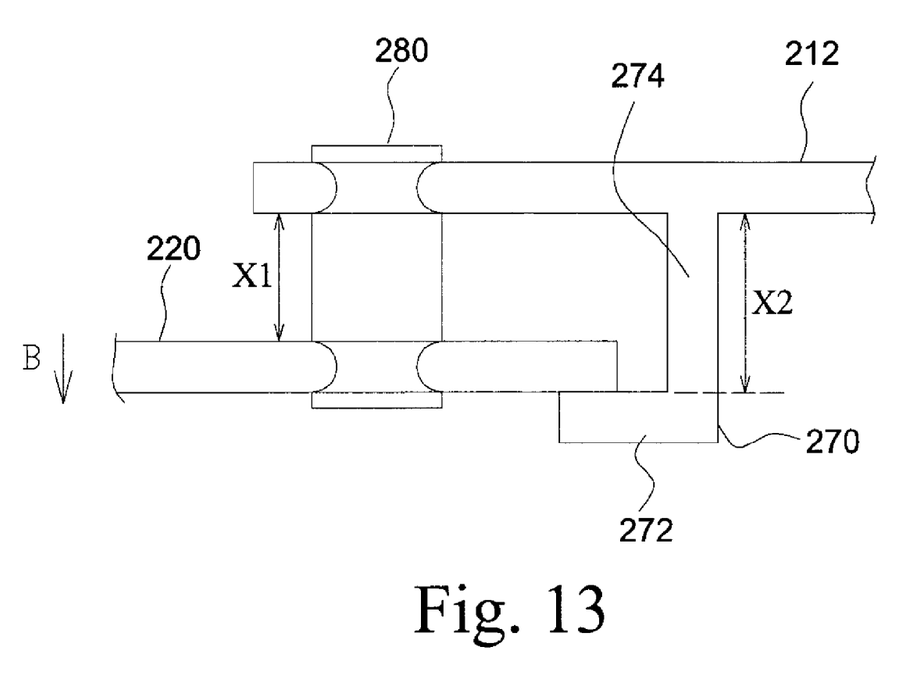
FIG. 13 is a sectional view of the interference between a stopper and the traverse frame.

Referring to FIG. 13, the interference between the stopper 270 and the traverse frame 220 is shown. When the shock is heavy, the damper 280 cannot entirely reduce the vibration of the traverse frame 220, and the traverse frame 220 further moves downward until interfered by the extended arm 272 of the stopper 270. The stopper 270 constrains the movement of the traverse frame 220 by interference and the first gap X1 is smaller than the second gap X2 as shown in FIG. 13. The traverse 212 and the traverse frame 220 would not be separated even when the optical disk drive suffers a heavy hit according to the present invention.

According to the present invention, the traverse is disposed on the traverse frame by the damper having two necks. The optical disk drive including the stopper can prevent the separation between the traverse and the traverse frame without screws when a sudden hit is applied thereto. And the optical disk drive of the present invention has lower cost and is easy to assemble.

While the invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An optical disk drive comprising:

a chassis;

a traverse frame having a first flange moveably connected to the chassis;

a traverse having a second flange, wherein one end of the traverse is disposed on the chassis and the other end is disposed on the traverse frame;

a damper having two separate necks, wherein the two separate necks of the damper are clamped on the first and the second flanges, respectively;

an optical pickup head disposed on the traverse for reading and/or writing information on an optical disk;

a motor disposed on the traverse for moving the optical pickup head;

a spindle motor disposed on the traverse for supporting and rotating the optical disk; and a stopper comprising a protruded arm formed with the traverse and an extended arm extended from the protruded arm, wherein the protruded arm is protruded from the traverse and the extended arm is disposed above the traverse frame, wherein the extended arm of the stopper is interfered with the traverse frame under a heavy shock.

2. The optical disk drive according to claim 1, wherein the stopper is a L-shaped structure and the extended arm is perpendicular to the protruded arm.

3. The optical disk drive according to claim 1, wherein the protruded arm is bended downward and is perpendicular to the traverse.

4. The optical disk drive according to claim 1, wherein the protruded arm is bended upward and is perpendicular to the traverse.

* * * * *